(12) United States Patent
Kase et al.

(10) Patent No.: US 10,020,498 B2
(45) Date of Patent: Jul. 10, 2018

(54) COATED NICKEL HYDROXIDE POWDER FOR POSITIVE ELECTRODE ACTIVE MATERIAL FOR ALKALINE SECONDARY BATTERY, AND PRODUCTION METHOD THEREFOR

(71) Applicant: SUMITOMO METAL MINING CO., LTD., Tokyo (JP)

(72) Inventors: Katsuya Kase, Ehime (JP); Ryuichi Kuzuo, Ehime (JP); Minoru Shiraoka, Ehime (JP); Hideo Sasaoka, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 279 days.

(21) Appl. No.: 14/438,540

(22) PCT Filed: Oct. 12, 2013

(86) PCT No.: PCT/JP2013/077867
§ 371 (c)(1),
(2) Date: Apr. 24, 2015

(87) PCT Pub. No.: WO2014/065146
PCT Pub. Date: May 1, 2014

(65) Prior Publication Data
US 2015/0280224 A1    Oct. 1, 2015

(30) Foreign Application Priority Data

Oct. 25, 2012 (JP) ................. 2012-235466
Feb. 28, 2013 (JP) ................. 2013-038332

(51) Int. Cl.
*H01M 4/36* (2006.01)
*H01M 4/52* (2010.01)
*H01M 4/62* (2006.01)
*H01M 4/525* (2010.01)
*H01M 10/30* (2006.01)

(52) U.S. Cl.
CPC ............ *H01M 4/366* (2013.01); *H01M 4/52* (2013.01); *H01M 4/525* (2013.01); *H01M 4/624* (2013.01); *H01M 10/30* (2013.01)

(58) Field of Classification Search
CPC ........ H01M 4/366; H01M 4/52; H01M 4/525; H01M 4/624; H01M 10/30
See application file for complete search history.

(56) References Cited

U.S. PATENT DOCUMENTS

| | | | |
|---|---|---|---|
| 5,523,182 A * | 6/1996 | Ovshinsky | H01M 4/32 429/223 |
| 6,558,842 B2 | 5/2003 | Seyama et al. | |
| 8,603,677 B2 | 12/2013 | Kuzuo et al. | |
| 2009/0202909 A1* | 8/2009 | Sakamoto | C01G 53/006 429/223 |
| 2011/0108759 A1 | 5/2011 | Sakamoto et al. | |
| 2012/0276453 A1* | 11/2012 | Kuzuo | H01M 4/52 429/223 |

FOREIGN PATENT DOCUMENTS

| | | | |
|---|---|---|---|
| JP | S63152866 | | 6/1988 |
| JP | 63-216268 | * | 9/1988 |
| JP | H7133115 | | 5/1995 |
| JP | 2000149941 | | 5/2000 |
| JP | 2003157840 | | 5/2003 |
| JP | 2012091955 | | 5/2012 |

OTHER PUBLICATIONS

Machine translation of JP 63-216268, published on Sep. 8, 1988.*
English Abstract of JP S63152866.
English Abstract of JP H07133115.
English Abstract of JP 2000149941.
English Abstract of JP 2012091955.
English Abstract of JP 2003157840.

* cited by examiner

*Primary Examiner* — Anca Eoff
(74) *Attorney, Agent, or Firm* — Dykema Gossett PLLC

(57) ABSTRACT

A method for producing coated nickel hydroxide powder for a positive electrode of an alkaline secondary battery wherein the pH of a suspension of a nickel hydroxide powder is kept at 8 to 11.5, and an aqueous cobalt salt solution and an aqueous alkali solution are supplied to the suspension to coat the surface of nickel hydroxide particles with cobalt hydroxide. Then, the pH of a slurry of the cobalt hydroxide-coated nickel hydroxide powder is adjusted to 12.5 to 13.0, and oxygen is supplied to the slurry so that the total amount of oxygen supplied per mole of cobalt in the coating is 30 l/mol or more to oxidize the cobalt hydroxide.

8 Claims, 1 Drawing Sheet

COATED NICKEL HYDROXIDE POWDER FOR POSITIVE ELECTRODE ACTIVE MATERIAL FOR ALKALINE SECONDARY BATTERY, AND PRODUCTION METHOD THEREFOR

TECHNICAL FIELD

The present invention relates to a nickel hydroxide powder for a positive electrode active material of alkaline secondary battery and a method for producing such a nickel hydroxide powder. Particularly, the present invention relates to a coated nickel hydroxide powder coated with a cobalt compound to ensure conductivity between particles thereof and enhance the utilization ratio, lifetime characteristics, and output characteristics of a battery, and a method for producing such a coated nickel hydroxide powder.

BACKGROUND ART

With recent development of portable devices, there has been a strong demand for higher-capacity secondary batteries for use in such devices. For example, a nickel hydroxide powder for a positive electrode material for alkaline secondary battery has been improved by forming a solid solution with cobalt to improve the utilization ratio of an alkaline secondary battery at high temperatures or by forming a solid solution with zinc or magnesium to improve the lifetime characteristics of an alkaline secondary battery.

Alkaline secondary batteries have come to be used as high-output power sources such as power sources for hybrid cars; therefore, there has been a strong demand not only for such improvement in utilization ratio at high temperatures or lifetime characteristics but also for improvement in output characteristics. However, a nickel hydroxide powder for a positive electrode active material of alkaline secondary battery is an electrical insulating material and poor in conductivity, which causes a problem that an electrical current does not sufficiently run through nickel hydroxide; therefore, the electrochemical availability of nickel hydroxide is low.

In order to solve such a problem, a cobalt compound such as cobalt oxide or cobalt hydroxide is added as a conductive material to ensure conductivity between nickel hydroxide particles. Such a cobalt compound added is dissolved in a high-concentration alkali metal hydroxide solution used as an electrolyte in an alkaline secondary battery, and is oxidized and deposited as cobalt oxyhydroxide on the surface of nickel hydroxide particles during electrical charge so that electrical conductivity is developed and a conductive network is formed between the nickel hydroxide particles.

A positive electrode using a nickel hydroxide powder and such a cobalt compound as an additive is generally produced by the steps of mixing a nickel hydroxide powder, a cobalt compound powder, and a binder to form a paste, filling the pores of a three-dimensional metal porous body, such as a foamed metal (made of nickel metal), with the paste, and subjecting the three-dimensional metal porous body to drying and pressing. However, the cobalt compound powder mixed together with the binder is not necessarily well dispersed in the nickel hydroxide powder. Therefore, the positive electrode has a problem that its utilization ratio is significantly reduced under the conditions of use during high-load electrical charge.

As a means for solving such a problem, a method has been proposed in which the surface of particles of a nickel hydroxide powder is coated with a cobalt compound. For example, Patent Literature 1 proposes a nickel active material for storage battery mainly comprising nickel hydroxide particles having a β-type cobalt hydroxide thin layer formed thereon. Patent Literature 1 states that this nickel active material is obtained by depositing a nickel hydroxide powder from a nickel salt in an aqueous alkali solution, immersing the nickel hydroxide powder in an aqueous solution of cobalt sulfate or cobalt nitrate, and neutralizing the aqueous solution with an aqueous alkali solution.

Further, Patent Literature 2 proposes a method for producing a nickel hydroxide powder coated with cobalt hydroxide, in which a cobalt-containing aqueous solution and an ammonium ion supplier are simultaneously, continuously, and quantitatively supplied to a nickel hydroxide powder containing aqueous solution adjusted to pH 11 to 13 with a caustic alkali.

Further, Patent Literature 3 proposes a method in which a cobalt ion-containing aqueous solution is supplied to a suspension of a raw nickel hydroxide powder at a supply rate of 0.7 g/min or less in, terms of cobalt per kilogram of the raw nickel hydroxide powder, and an ammonium ion-containing aqueous solution is supplied to the suspension to achieve a nickel ion concentration of 10 to 50 mg/l and a cobalt ion concentration of 5 to 40 mg/l while the pH, temperature, and ammonium ion concentration of the suspension are kept at predetermined values.

CITATION LIST

Patent Literatures

Patent Literature 1: JP 63-152866 A
Patent Literature 2 JP 7-133115 A
Patent Literature 3 JP 2000-149941 A

SUMMARY OF INVENTION

Technical Problem

All the above methods described in Patent Literatures 1 to 3 are intended to ensure the dispersibility and uniformity of a conductive cobalt compound by previously coating the surface of particles of a nickel hydroxide powder with cobalt hydroxide. However, such conventional methods have a problem that a cobalt hydroxide coating is non-uniformly formed on the surface of nickel hydroxide particles or is peeled off in the process of paste preparation; therefore, it is difficult to ensure the uniformity and adhesion properties of a conductive cobalt compound.

In view of the circumstances, it is an object of the present invention to provide a method for producing a coated nickel hydroxide powder suitable for a positive electrode active material of alkaline secondary battery, in which a coating mainly containing cobalt oxyhydroxide or a mixture of cobalt oxyhydroxide and cobalt hydroxide is formed on the surface of particles of a nickel hydroxide powder in an aqueous solution while the uniformity and adhesion properties of the coating are ensured.

Solution to Problem

In order to achieve the above object, the present inventors have intensively studied a method for coating the surface of nickel hydroxide particles with cobalt oxyhydroxide, and as a result have found that the state of diffusion of an aqueous cobalt salt solution and an aqueous alkali solution in a suspension, obtained by dispersing a nickel hydroxide powder in water, during formation of a cobalt hydroxide coating has a great effect on the uniformity and adhesion properties of the cobalt hydroxide coating. Further, the present inventors have also found that the adhesion properties of the coating can be improved by oxidizing the cobalt hydroxide coating to cobalt oxyhydroxide under optimum conditions. These findings have led to the completion of the present invention.

More specifically, the present invention is directed to a production method for a coated nickel hydroxide powder for a positive electrode active material of alkaline secondary battery comprising: a coating step in which an aqueous cobalt salt solution and an aqueous alkali solution are supplied to a stirred suspension obtained by dispersing a nickel hydroxide powder in water to form, on a surface of nickel hydroxide particles, a coating mainly containing cobalt hydroxide crystallized out by neutralization; and an oxidation step in which oxygen is supplied to a stirred slurry of the nickel hydroxide particles having the coating formed thereon to oxidize cobalt hydroxide in the coating, wherein in the coating step, a ratio of a supply rate (p) of the aqueous cobalt salt solution to a product of a supply width (d) of the aqueous cobalt salt solution in a direction orthogonal to a flow direction of the suspension and a flow velocity (v) of the suspension in a contact portion between the suspension and the aqueous cobalt salt solution, that is, $\rho/(d \times v)$ is controlled to be $3.5 \times 10^{-4}$ mol/cm$^2$ or less while a pH of the suspension mixed with the aqueous cobalt salt solution and the aqueous alkali solution as measured at 25° C. is kept at 8 to 11.5, and in the oxidation step, a pH of the slurry is adjusted to 12.5 or higher as measured at 25° C., and a total amount of oxygen supplied by blowing into the slurry per mole of cobalt in the coating is 30 l/mol or more.

The present invention is also directed to a coated nickel hydroxide powder for a positive electrode active material of alkaline secondary battery, comprising nickel hydroxide powder particles having, on a surface thereof, a coating made of a cobalt compound, mainly containing cobalt oxyhydroxide or a mixture of cobalt oxyhydroxide and cobalt hydroxide, wherein a valence of cobalt in the coating is 2.5 or more. Further, when 20 g of the coated nickel hydroxide powder for a positive electrode active material of alkaline secondary battery according to the present invention is shaken in a closed container for 1 hour, an amount of the coating peeled off is 20 mass % or less of a total amount of the coating.

Advantageous Effects of Invention

According to the present invention, the surface of particles of a nickel hydroxide powder can be coated with cobalt hydroxide in a suspension while the uniformity and adhesion properties of a coating mainly containing cobalt hydroxide are stably ensured. Further, the adhesion properties of the coating can be further improved by oxidizing cobalt hydroxide that coats the surface of the particles of the nickel hydroxide powder. Therefore, the coated nickel hydroxide powder according to the present invention has a uniform coating, mainly containing cobalt oxyhydroxide or a mixture of cobalt oxyhydroxide and cobalt hydroxide, formed on the surface of particles thereof and can prevent its coating from being peeled off in the process of preparing a paste by mixing with a binder or the like, and is therefore excellent for a positive electrode active material of alkaline secondary battery.

Further, the coated nickel hydroxide powder according to the present invention not only can prevent peeling-off of the coating during paste preparation but also has high conductivity, and is therefore particularly suitable as a positive electrode active material for use in an alkaline secondary battery used as a power source for electric car or hybrid car required to have high-output characteristics. Further, the coated nickel hydroxide powder according to the present invention is improved in utilization ratio due to its improved conductivity, and is therefore extremely effective as a positive electrode active material for use in an alkaline secondary battery used as a power source for portable electronic device required to have a high capacity.

DESCRIPTION OF EMBODIMENTS

Figure 1:
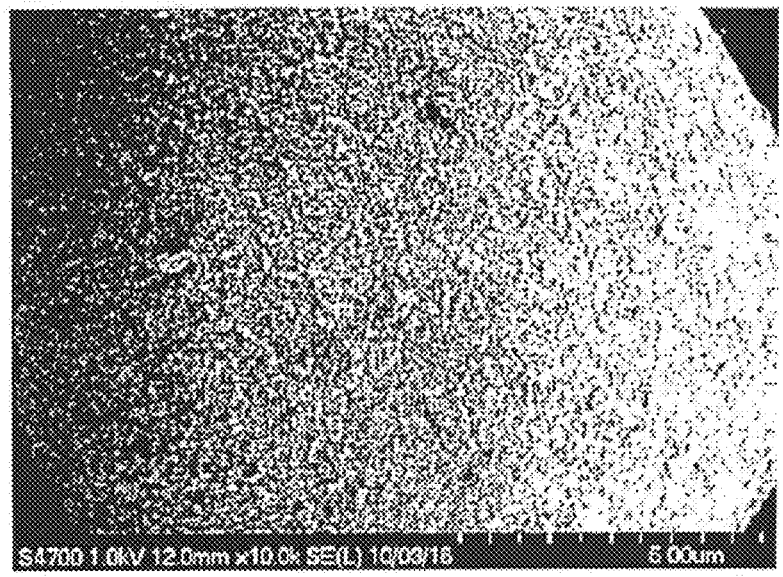
FIG. 1 A scanning electron micrograph of a cobalt-oxyhydroxide-coated nickel hydroxide powder prepared in Example 1.

In a general method for producing a coated nickel hydroxide powder for a positive electrode active material of alkaline secondary battery, an aqueous cobalt salt solution and an aqueous alkali solution are added to a stirred suspension obtained by dispersing a nickel hydroxide powder in water so that the surface of the nickel hydroxide powder is coated with cobalt hydroxide by a crystallization reaction caused by neutralization. In this method, cobalt is present in its ionic state in a region of the suspension where a pH value is low, but deposition of cobalt hydroxide gradually starts as the pH value increases. At this time, when nickel hydroxide particles are present near cobalt hydroxide, the cobalt hydroxide is deposited on the surface of the nickel hydroxide particles that are energetically more stable.

The present inventors have closely studied such a deposition process of cobalt hydroxide, and as a result have found that when the concentration of cobalt ions rapidly increases and exceeds its critical supersaturation in the pH range of the suspension in which cobalt ions are present, cobalt hydroxide is deposited alone in water even when nickel hydroxide particles are not present near the cobalt hydroxide. However, when the pH value of the suspension is low, more specifically when the pH is less than 8, the deposition rate of cobalt hydroxide is low; therefore, cobalt hydroxide is not deposited alone even when the concentration of cobalt ions exceeds it critical supersaturation.

On the other hand, when the pH value of the suspension in which cobalt ions are present is 8 or higher, the critical supersaturation of the concentration of cobalt ions is reduced. Therefore, the concentration of cobalt ions easily exceeds its critical supersaturation when it increases. As a result, cobalt hydroxide is deposited alone without adhering to the surface of nickel hydroxide particles. It has been found that such cobalt hydroxide deposited alone adheres to the surface of nickel hydroxide particles when a nickel hydroxide slurry is filtered, but the cobalt hydroxide sparsely adheres to the surface of nickel hydroxide particles and is therefore poor in uniformity, and in addition, the cobalt hydroxide is very poor in adhesion properties because adhesion between the cobalt hydroxide and the nickel hydroxide particles is achieved simply by filtration.

Based on the results of the study of such a deposition process of cobalt hydroxide, in order to uniformly form cobalt hydroxide having high adhesion properties on the surface of particles of a nickel hydroxide powder in a coating step of a method according to the present invention, the pH (as measured at 25° C.) of a suspension of the nickel hydroxide particles is controlled to be 8 or higher, and the concentration of cobalt ions in the suspension in such a pH range is kept at or below a concentration at which cobalt hydroxide is not deposited alone. According to such a method, cobalt hydroxide is deposited on the surface of nickel hydroxide particles in accordance with the surface structure of nickel hydroxide; therefore, a coating having extremely high adhesion properties is uniformly formed on the surface of the particles.

In order to reliably deposit such cobalt hydroxide excellent in uniformity and adhesion properties, it is important to avoid the creation of a region where the concentration of cobalt ions is high. This is achieved by reducing the ratio of the supply rate of the aqueous cobalt salt solution to the amount of the suspension flowing into a portion where the aqueous cobalt salt solution is supplied to and mixed with the suspension. That is, it is necessary to prevent the appearance of a region where the concentration of cobalt ions is extremely high in the suspension. This is achieved by reducing the supply rate of the aqueous cobalt salt solution to sufficiently reduce the concentration of a cobalt salt even when the amount of the suspension mixed with the aqueous cobalt salt solution is small, or by increasing the amount of the suspension mixed with the aqueous cobalt salt solution to diffuse the aqueous cobalt salt solution supplied to the suspension as quickly as possible for dilution.

The amount of the suspension mixed with the aqueous cobalt salt solution may be considered as the amount of the suspension flowing into a portion where the aqueous cobalt salt solution supplied comes into contact with the surface of the suspension and is mixed with the suspension. The mixing is initially performed in an extremely short period of time; therefore, when the flow velocity of the suspension is sufficiently high, the amount of suspension mixed with the aqueous cobalt salt solution can be considered as the surface of the suspension that comes into contact with the aqueous cobalt salt solution per unit time. That is, the amount of the suspension mixed with the aqueous cobalt salt solution can be considered as the product of the supply width (d) of the aqueous cobalt salt solution in a direction orthogonal to the flow direction of the suspension and the surface flow velocity (v) of the suspension in a contact portion between the surface of the suspension and the aqueous cobalt salt solution. It is to be noted that when the contact portion between the surface of the suspension and the aqueous cobalt salt solution is circular, the supply width (d) of the aqueous cobalt salt solution in a direction orthogonal to the flow direction of the suspension is equal to the diameter of the circular contact portion. Further, when it is difficult to actually measure the surface flow velocity of the suspension, the surface flow velocity of the suspension can be easily determined by simulation.

In the present invention, the ratio of the supply rate $\rho$ (mol/sec) of the aqueous cobalt salt solution to the product of the supply width d (cm) of the aqueous cobalt salt solution in a direction orthogonal to the flow direction of the suspension and the flow velocity v (cm/sec) of the suspension in a contact portion between the surface of the suspension and the aqueous cobalt salt solution, that is, $\rho/(d \times v)$ needs to be small. More specifically, the ratio needs to be $3.5 \times 10^{-4}$ mol/cm$^2$ or less, and is preferably $2.0 \times 10^{-4}$ mol/cm$_2$ or less.

If the ratio $\rho/(d \times v)$ exceeds $3.5 \times 10^{-4}$ mol/cm$^2$, a region where the concentration of cobalt ions is high appears so that cobalt hydroxide is deposited alone. It is to be noted that the lower limit of the ratio $\rho/(d \times v)$ is not particularly limited, but is preferably $0.01 \times 10^{-4}$ mol/cm$^2$ or more because a reduction in the supply rate ($\rho$) reduces productivity.

Here, when the opening size of a supply port for the aqueous cobalt salt solution is small enough to supply the aqueous cobalt salt solution as a stable liquid flow whose cross-section is substantially the same in size as the opening of the supply port, the area of the contact portion, that is, the area of a portion where the aqueous cobalt salt solution supplied from the supply port toward the surface of the suspension first comes into contact with the surface of the suspension coincides with the projected area of the supply port onto the surface of the suspension. That is when the opening size of the supply port for the aqueous cobalt salt solution is small as described above, the area of the contact portion between the surface of the suspension and the aqueous cobalt salt solution may be regarded as the projected area of the supply port onto the surface of the suspension. On the other hand, when the opening size of the supply port for the aqueous cobalt salt solution is larger than that described above, the flow velocity of the aqueous cobalt salt solution discharged from the supply port is generally low, which makes it impossible to uniformly supply the aqueous cobalt salt solution from the supply port and makes it difficult to control the area of the contact portion between the surface of the suspension and the aqueous cobalt salt solution.

Therefore, in order to supply the aqueous cobalt salt solution as a stable liquid flow from the supply port, the area of opening of the supply port is preferably 0.01 to 1.0 cm$^2$. If the area of opening of the supply port is less than 0.01 cm$^2$, there is a case where the supply rate of the aqueous cobalt salt solution is low; therefore, sufficient productivity cannot be achieved. On the other hand, if the cross-sectional area of the supply port exceeds 1.0 cm$^2$, there is a case where the aqueous cobalt salt solution is not sufficiently diffused because it is difficult to uniformly supply the aqueous cobalt salt solution from the supply port; therefore, the amount of the aqueous cobalt salt solution supplied varies even when the contact portion between the surface of the suspension and the aqueous cobalt salt solution is within a region defined by the projected area of the supply port onto the surface of the suspension so that the aqueous cobalt salt solution is likely to be intensively supplied to a particular portion.

It is to be noted that when the aqueous cobalt salt solution is supplied by spraying it from the supply port onto the surface of the suspension with a spray nozzle or the like, the area of contact between the aqueous cobalt salt solution and the surface of the suspension can be regarded as the area of a region where the aqueous cobalt salt solution is sprayed onto the surface of the suspension. Alternatively, two or more supply ports may be provided to increase the total amount of the aqueous cobalt salt solution supplied to increase productivity as long as, as described above, the aqueous cobalt salt solution can be uniformly supplied from the supply ports to the surface of the suspension. The number of supply ports is not particularly limited, and may be determined in consideration of the supply rate of the aqueous cobalt salt solution supplied from each of the supply port or the product of the supply width of the aqueous cobalt salt solution and the flow velocity of the suspension.

Further, also when the pH value of the suspension rapidly increases in a portion where the aqueous cobalt salt solution is supplied, the concentration at which cobalt hydroxide is not deposited alone in such a high pH range is reduced so that cobalt hydroxide is easily deposited alone. As a result, cobalt hydroxide is started to be deposited alone even when nickel hydroxide particles are not present near the cobalt hydroxide; therefore cobalt hydroxide poor in adhesion properties and uniformity is likely to adhere to the surface of nickel hydroxide particles. In order to prevent this, it is preferred that the aqueous alkali solution supplied simultaneously with the aqueous cobalt salt solution is also diffused at a sufficiently high speed to inhibit the creation of a high pH region due to a rapid increase in the concentration of the aqueous alkali solution.

For example, if the supply rate of a cobalt salt to the surface of the suspension per unit area exceeds 0.01 mol/cm$^2$·min even when the flow velocity of the suspension is sufficiently high, a reaction occurs due to contact between a high pH region and the aqueous cobalt salt solution before the aqueous alkali solution is sufficiently diffused in the suspension when the distance between the supply position of the aqueous cobalt salt solution added and the supply position of the aqueous alkali solution added is short. In this case, there is a high possibility that cobalt hydroxide poor in adhesion properties and uniformity is deposited.

In order to avoid this, the ratio of the distance (D) (cm) of separation between the supply position of the aqueous cobalt salt solution and the supply position of the aqueous alkali solution to the above-described ratio of the supply rate ρ of the aqueous cobalt salt solution to the product of the supply width d of the aqueous cobalt salt solution and the flow velocity v of the suspension $\{\rho/(d \times v)\}$, that is, $D/\{\rho/(d \times v)\}$ is preferably $0.5 \times 10^5$ cm$^3$/mol or more, more preferably $1.0 \times 10^5$ cm$^3$/mol or more. It is to be noted that the upper limit of the ratio $D/\{\rho/(d \times v)\}$ is not particularly limited, but is limited by the supply rate (ρ) of the aqueous cobalt salt solution or the size of a reactor, and is therefore preferably about $100 \times 10^5$ cm$^3$/mol.

Here, nickel hydroxide used as a core material to be coated with cobalt hydroxide may be one known for a positive electrode active material of alkaline secondary battery, but is particularly preferably a nickel hydroxide represented by the following general formula: $Ni_{1-x-y}Co_xM_y(OH)_2$ (wherein x is 0.005 to 0.05, y is 0.005 to 0.05, M is one or more of Ca, Mg, and Zn).

If x that represents a cobalt content in the above general formula is less than 0.005, the effect of improving charge efficiency achieved by adding cobalt cannot be obtained. On the other hand, if x exceeds 0.05, battery performance is degraded due to a reduction in discharge voltage. If y that represents the amount of M contained as an additive element in the above formula is less than 0.005, the effect of reducing a change in the volume of nickel hydroxide during discharge and charge achieved by adding the element M cannot be obtained. On the other hand, if y exceeds 0.05, the effect of reducing a change in the volume of nickel hydroxide can be obtained, but beyond that, a reduction in battery capacity is caused so that battery performance is undesirably degraded.

Hereinbelow, a coating process in the method for producing a coated nickel hydroxide powder according to the present invention will be more specifically described. It is to be noted that the production method according to the present invention can achieve improvement in productivity when performed in a continuous manner, but is preferably performed in a batch manner to form a uniform coating on nickel hydroxide particles. Therefore, the following production method will be described with reference to a case of a batch manner.

First, a suspension of a nickel hydroxide powder, an aqueous solution of a cobalt salt, and an aqueous solution of an alkali are prepared. The nickel hydroxide powder used as a core material preferably has an average particle size of 6 to 12 μm so that a battery using a resulting coated-nickel hydroxide powder as a positive electrode material can achieve excellent battery characteristics. Further, the concentration of the nickel hydroxide in the suspension is preferably 400 to 1200 g/l. If the concentration thereof is less than 400 g/l, there is a case where cobalt hydroxide is deposited alone in the suspension due to the lack of surface active sites of nickel hydroxide particles where deposition of cobalt hydroxide occurs. On the other hand, the concentration of the nickel hydroxide exceeds 1200 g/l, there is a case where the suspension cannot be sufficiently stirred due to an increase in viscosity so that a cobalt hydroxide coating is non-uniformly formed.

The cobalt salt is not particularly limited as long as the cobalt salt is a water-soluble cobalt compound from which cobalt hydroxide is generated by pH control. More specifically, the cobalt salt is preferably cobalt sulfate or cobalt chloride, more preferably cobalt sulfate not contaminated with halogens. The alkali is not particularly limited, but is preferably water-soluble sodium hydroxide or potassium hydroxide, and is particularly preferably sodium hydroxide from the viewpoint of costs.

The suspension of the nickel hydroxide powder is preferably prepared by dispersing nickel hydroxide powder in pure water or the like to prevent, impurity incorporation. The aqueous cobalt salt solution or the aqueous alkali solution is also preferably prepared by dissolving a cobalt salt or an alkali in pure water, respectively. It is to be noted that the concentrations of the aqueous cobalt salt solution and the aqueous alkali solution are not particularly limited as long as redeposition does not occur in tubes or the like of an apparatus used and a problem does not occur even when the concentration of nickel hydroxide in the suspension varies, and an aqueous cobalt salt solution and an aqueous alkali solution having predetermined concentrations that depend on, for example, the concentration of the suspension can be used.

When the production method is performed in a batch manner, the aqueous cobalt salt solution and the aqueous alkali solution for forming a coating are continuously supplied to a reactor containing the stirred suspension of the nickel hydroxide powder used as a core material. As a result, the surface of nickel hydroxide particles is coated with cobalt hydroxide crystallized out by neutralization so that a cobalt-hydroxide-coated nickel hydroxide powder is produced. The reactor used in the batch-wise production method is not particularly limited, but preferably has a stirring device and a liquid temperature-regulating system to form a uniform coating on the surface of particles of the nickel hydroxide powder.

The aqueous cobalt salt solution and the aqueous alkali solution need to be supplied individually, but may be supplied at the same time as long as they are supplied individually. The aqueous cobalt salt solution and the aqueous alkali solution may be supplied together with a part of the suspension to the residual suspension contained in the reactor. However, when all these liquids are previously mixed and supplied as a mixed liquid to the reactor, there is a case where a reaction occurs in the mixed liquid so that cobalt hydroxide is deposited alone. Further, when the aqueous cobalt salt solution and the aqueous alkali solution are not supplied to the suspension individually, there is a case where the amount of a cobalt hydroxide coating formed on the surface of nickel hydroxide particles is not uniform among the particles.

The pH of the suspension at the time when the aqueous cobalt salt solution and the aqueous alkali solution supplied are mixed until an equilibrium state is achieved is kept in the rang of 8 to 11.5 as measured at 25° C., and is preferably kept in the range of 9.5 to 10.5 as measured at 25° C. If the pH value of the suspension is less than 8, the deposition rate of cobalt hydroxide is too lows therefore, productivity is reduced. On the other hand, if the pH value of the suspension exceeds 11.5, there is a case where generated cobalt hydroxide is likely to gelate; therefore, it is difficult to form an excellent cobalt hydroxide coating.

Further, the pH of the suspension is preferably kept at a certain value in the range of 8 to 11.5 as measured at 25° C. and controlled so that its fluctuation range is within ±0.2. If the fluctuation range of the pH exceeds the above limit, there is a fear that the amount of a cobalt hydroxide coating varies. It is preferred that the pH of the suspension is continuously measured with, for example, a pH controller using a glass electrode method, and the flow rate of the aqueous alkali solution is continuously feedback-controlled with the pH controller so that the pH is kept constant within the above fluctuation range.

The temperature of the suspension is preferably in the range of 30 to 60° C. before and after the aqueous cobalt salt solution and the aqueous alkali solution are added. If the temperature of the suspension is less than 30° C., cobalt hydroxide is slowly deposited due to a low reaction rate. On the other hand, if the temperature of the suspension exceeds 60° C., cobalt hydroxide is likely to be non-uniformly deposited on the surface of nickel hydroxide particles due to too high a reaction rate. Further, the temperature of the suspension is preferably kept at a certain value within the above temperature range and controlled so that its fluctuation range is ±1° C. If the fluctuation range of the temperature of the suspension exceeds the above limit, there is a fear that the concentration of impurities in deposited cobalt hydroxide varies so that a battery using a resulting coated nickel hydroxide powder does not have stable characteristics.

In the above-described coating step, a coating that is excellent in uniformity and adhesion properties and mainly contains cobalt hydroxide can be formed on the surface of particles of a nickel hydroxide powder. According to the production method of the present invention, cobalt hydroxide constituting the coating is oxidized to cobalt oxyhydroxide in a next oxidation step, which makes it possible to further improve the adhesion properties of the coating and the conductivity of the coated nickel hydroxide powder.

More specifically, the production method for a coated nickel hydroxide powder according to the present invention includes an oxidation step in which oxygen is supplied to a stirred slurry of the nickel hydroxide powder having a cobalt hydroxide coating formed on the surface of particles thereof in the coating step to oxidize cobalt hydroxide constituting the coating to cobalt oxyhydroxide according to the following reaction formula represented by a chemical formula 1.

$Co(OH)_2 + \frac{1}{4}O_2 \rightarrow CoOOH + \frac{1}{2}H_2O$     [Chemical Formula 1]

Cobalt oxyhydroxide can be obtained also by oxidizing cobalt hydroxide using an oxidizer such as sodium hypochlorite or persulfate. However, when the nickel hydroxide powder coated with cobalt hydroxide is oxidized with such an oxidizer, part of the nickel hydroxide powder as a core material is also oxidized so that the adhesion properties of the cobalt hydroxide coating is unstable due to generation of relatively unstable nickel oxyhydroxide. Further, the use of an expensive oxidizer such as sodium hypochlorite or persulfate is disadvantageous also in terms of cost in consideration of industrial productivity.

In the oxidation step, the presence of OH ions in the slurry promotes the oxidation reaction, which makes it possible to oxidize cobalt hydroxide to cobalt oxyhydroxide without using an expensive oxidizer. Therefore, the concentration of OH ions in the slurry, more specifically the pH of the slurry needs to be kept at 12.5 or higher as measured at 25° C. in the oxidation step. By keeping the pH of the slurry at 12.5 or higher, the oxidation reaction is promoted; therefore, cobalt hydroxide can be oxidized to cobalt oxyhydroxide by supplying oxygen into the slurry. If the pH of the slurry is less than 12.5, the oxidation reaction is not sufficiently promoted and requires a long reaction time, which reduces industrial productivity. If the reaction is terminated in a short period of time, cobalt hydroxide is insufficiently oxidized to cobalt oxyhydroxide so that the adhesion properties of the coating is low and the conductivity of the coated nickel hydroxide powder is also poor.

On the other hand, the pH of the slurry in the oxidation step exceeding 13.5 only increases the cost of an alkali used. This is because even if the pH of the slurry in the oxidation step exceeds 13.5, the effect of promoting oxidation is not higher than that obtained when the pH of the slurry is 13.5 or less. Therefore, the pH of the slurry in the oxidation step is preferably kept at 12.5 or higher but 13.5 or less as measured at 25° C., more preferably 12.5 or higher but 13.0 or less as measured at 25° C. Further, if the concentration of OH ions frequently varies, there are variations in oxidation to cobalt oxyhydroxide, which adversely affects the battery characteristics of a battery using the resulting coated nickel hydroxide powder as a positive electrode material. For this reason, the fluctuation range of the pH of the slurry in the oxidation step is preferably ±0.2, more preferably ±0.1.

In the oxidation, step, the total amount of oxygen supplied by blowing into the slurry per mole of cobalt in the coating is 30 l/mol or more. As can be seen from the above chemical formula 1, the amount of oxygen that needs to be supplied to complete the reaction is ¼ of the molar quantity of cobalt contained in the cobalt hydroxide coating to be oxidized, which corresponds to 5.6 l in terms of the amount of oxygen under standard conditions. Oxygen gas or an oxygen-containing gas supplied in the oxidation step is dispersed as bubbles in the slurry, and is partially dissolved in the solvent of the slurry. However, all the oxygen gas or oxygen-containing gas does not contribute to the oxidation reaction of cobalt hydroxide, and most of the oxygen gas or oxygen-containing gas is directly discharged to the outside of a reaction system. Therefore, it is necessary to supply oxygen in an amount of 6 to 20 times the amount of oxygen that needs to be supplied for the reaction represented by the above chemical formula.

If the total amount of oxygen supplied is less than 30 l/mol, part of cobalt hydroxide insufficiently subjected to the oxidation reaction remains so that the adhesion properties of the coating is reduced. On the other hand, even if the total amount of oxygen supplied exceeds 110 l/mol, oxygen is wastefully supplied as this cause oxygen supply even after the completion of the oxidation of cobalt hydroxide in the coating, and in addition, nickel hydroxide as a core material may be oxidized. For this reason, the total amount of oxygen supplied per mole of cobalt in the cobalt hydroxide coating is preferably 30 l/mol or more but 110 l/mol or less.

The supply of oxygen is preferably performed so that the amount of oxygen supplied per unit time is 0.2 to 0.45 l/min·mol. If the amount of oxygen supplied per unit time is less than 0.2 l/min·mol, the oxidation reaction of cobalt hydroxide to cobalt oxyhydroxide is unnecessarily slow, which is impractical due to reduction in industrial productivity. On the other hand, if the amount of oxygen supplied per unit time exceeds 0.45 l/min·mol, there is a case where the supply rate of oxygen is much higher than the oxidation rate of cobalt hydroxide; therefore, the oxidation reaction of cobalt hydroxide is inefficient so that cobalt hydroxide is not sufficiently oxidized. Further, there is also a case where high adhesion properties cannot be achieved due to non-uniform oxidation state of cobalt hydroxide. For this reason, the amount of oxygen supplied per unit time is set to 0.2 to 0.45 l/min·mol so that cobalt hydroxide can be properly and efficiently oxidized.

Further, the supply of oxygen is preferably performed for 2.5 to 4.0 hours. If the supply time of oxygen is less than 2.5 hours, there is a case where the reaction does not proceed to the extent that cobalt hydroxide is sufficiently oxidized irrespective of the amount of oxygen supplied per unit time. On the other hand, even if the supply time of oxygen exceeds 4.0 hours, oxygen is only wasted, and in addition, there is a case where the oxidation reaction excessively proceeds; therefore, nickel hydroxide as a core material is also oxidized so that the adhesion properties of the coating is reduced. For this reason, the supply time of oxygen is set to 2.5 to 4.0 hours so that cobalt hydroxide can be efficiently and sufficiently oxidized.

In the oxidation step, the temperature of the slurry during the oxidation reaction is preferably kept in the range of 40 to 60° C. if the temperature of the slurry is less than 40° C., there is a case where the reaction rate of the oxidation reaction is reduced so that the oxidation reaction of cobalt hydroxide to cobalt oxyhydroxide does not efficiently proceed. On the other hand, if the temperature of the slurry exceeds 60° C., the oxidation reaction excessively proceeds; therefore, unstable nickel oxyhydroxide is generated due to the oxidation of nickel hydroxide as a core material so that the adhesion properties of the coating is reduced.

The supply of oxygen to the slurry is not particularly limited to one using pure oxygen gas as long as the amount of oxygen contained in a gas supplied by blowing into the slurry satisfies the above-described requirements. Therefore, an oxygen-containing gas as well as oxygen gas may be used. Examples of the oxygen-containing gas include air, a mixed gas obtained by mixing oxygen and air in any ratio, and a mixed gas of oxygen and an inert gas. In consideration of handleability and cost, air is preferably used. When such a gas other than oxygen is used, the method according to the present invention can be applied by converting the above-described total amount of oxygen supplied and the amount of oxygen supplied per unit time to the total amount of the gas supplied and the amount of the gas supplied per unit time, respectively, based on the amount of oxygen contained in the gas supplied.

The slurry used in the oxidation step can be obtained by adjusting the pH of the suspension after the completion of the coating step. Alternatively, the slurry may be prepared by subjecting the suspension after the completion of the coating step to solid-liquid separation to collect the powder and again dispersing the collected powder in water. In this case, the collected powder is preferably in a wet state when again dispersed. This is because when the collected powder is dried, the coating formed on the surface of the particles in the coating step is excessively oxidized so that the adhesion properties of the coating is reduced. It is to be noted that the concentration of the slurry in the oxidation step may be the same as that of the suspension in the coating step.

A device used in the oxidation step is not particularly limited as long as the device has a system capable of adjusting the temperature of the slurry and blowing a gas into the slurry while stirring the slurry. For example, a commonly used reactor equipped with the above system is suitably used. Further, in order to stabilize the amount of blowing oxygen, the reactor is preferably one whose inside is shielded from outside air so that an atmosphere in the reactor can be controlled.

A coated nickel hydroxide powder for a positive electrode active material of alkaline secondary battery according to the present invention is obtained by the production method for a coated nickel hydroxide powder according to the present invention comprising the coating step and the oxidation step. The coated nickel hydroxide powder according to the present invention comprises nickel hydroxide powder particles having, on the surface thereof, a coating made of a cobalt compound mainly containing cobalt oxyhydroxide or a mixture of cobalt oxyhydroxide and cobalt hydroxide.

The valence of cobalt in the cobalt compound coating mainly containing cobalt oxyhydroxide or a mixture of cobalt oxyhydroxide and cobalt hydroxide of the coated nickel hydroxide powder according to the present invention is 2.5 or more, preferably 2.7 or more. When the valence of cobalt in the coating is 2.5 or more, a necessary amount of cobalt oxyhydroxide is generated in the coating so that excellent adhesion properties and conductivity are achieved. It is to be noted that the upper limit of valence of cobalt is usually 3.

Further, the amount of cobalt contained in the coating is preferably in the range of 3 to 7 mass % with respect to the total mass of the nickel hydroxide particles as a core material and the toting, that is, the total mass of the coated nickel hydroxide powder. If the amount of cobalt in the coating is less than 3 mass %, the effect of coating the surface of the cobalt hydroxide particles is not sufficiently obtained due to the shortage of the amount of the cobalt compound constituting the coating. On the other hand, if the amount of cobalt in the coating exceeds 7 mass %, the amount of the cobalt compound constituting the coating is increased, but the coating effect is not further enhanced. Further, the nickel hydroxide particles as a core material are preferably uniformly coated with the coating. The nickel hydroxide particles may be coated with small islands shape of the coating as long as the nickel hydroxide particles are uniformly coated, but are more preferably coated with a layer of the coating, and even more preferably fully coated with the coating.

Further, the cobalt compound coating mainly contains cobalt oxyhydroxide or a mixture of cobalt oxyhydroxide and cobalt hydroxide. The amount of cobalt contained in the coating is preferably 90 mass % or more, more preferably 95 mass % or more with respect to the total mass of metal elements contained in the coating. An additive element, such as Ca, Mg, or Zn, can be added to the cobalt compound coating to improve the battery characteristics of a battery having a cathode using the coated nickel hydroxide powder. However, if the amount of cobalt contained in the coating is less than 90 mass %, there is a case where conductivity cannot be sufficiently improved by the coating.

The coated nickel hydroxide powder according to the present invention is excellent in the uniformity and adhesion properties of the cobalt compound coating formed on the surface of the nickel hydroxide particles. Such excellent uniformity and adhesion properties of the coating makes it possible, when 20 g of the coated nickel hydroxide powder contained in a closed container is shaken for 1 hour, to limit the amount of the coating peeled off to 20 mass % or less, preferably 19 mass % or less of the total mass of the coating. If the amount of the coating peeled off exceeds 20 mass %, there is a case where the cobalt compound coating is peeled off during preparation of a paste so that the viscosity of the paste is unstable. In addition, the conductive cobalt compound is non-uniformly present in a positive electrode of a battery; therefore, a conductive network between the nickel hydroxide particles is not sufficiently formed, which results in poor battery characteristics such as positive electrode utilization efficiency.

The amount of the coating peeled off is measured in the following manner. First, a plastic circular cylindrical container is prepared which has such a capacity that the coated nickel hydroxide powder contained therein can be sufficiently shaken. Then, the coated nickel hydroxide powder is placed in the container, and the container is tightly closed. Then, the container is shaken by performing reciprocating movement in a direction parallel to the central axis of the container, rotation around the central axis of the container, and oscillation around the central point of the container in combination. Here, the closed container is preferably shaken at a reciprocating stroke of 50 to 250 mm and a frequency of 30 to 60 times/min. More specifically, for example, a tightly-closed polyethylene jar having a capacity of 50 ml and containing the powder may be shaken with a TURBULA shaker mixer (container capacity: 2 L, e.g., TURBULA Type T2C manufactured by Willy A. Bachof en (WAB)). A device used for the shaking of the closed container is not limited to the device exemplified above, and may be any device capable of shaking the container in the same manner. After the completion of the shaking, 10 g of the coated nickel hydroxide powder is mixed with 200 ml of pure water with stirring, and is then allowed to stand to separate the coating peeled off as a supernatant. Then, the settled coated nickel hydroxide powder is collected and dried. The amount of the coating peeled off can be determined by comparison between the cobalt content of the collected coated nickel hydroxide powder and the cobalt content of the coated nickel hydroxide powder before shaking.

As described above, when the amount of the cobalt compound coating peeled off is limited to 20 mass % or less of the total mass of the coating, the coating is not peeled off when the coated nickel hydroxide powder is mixed with a binder or the like in the process of preparing a positive electrode paste for alkaline secondary battery, or even when the coating is peeled off, the ratio of the amount of the coating peeled off to the total amount of the coating is low; therefore, conductivity between the nickel hydroxide particles in a positive electrode is sufficiently ensured. For this reason, the coated nickel hydroxide powder according to the present invention is extremely excellent for a positive electrode active material of alkaline secondary battery.

EXAMPLES

Example 1

Six kilograms of a spherical nickel hydroxide powder having an average particle size of 8 µm was placed in a reactor having a diameter of 25 cm and a depth of 30 cm, and water was added to the reactor so that a total volume was 10 liters. Then, the nickel hydroxide powder was dispersed in the water by stirring using a propeller stirrer at a rotation speed of 500 rpm to prepare a suspension of the nickel hydroxide powder.

The suspension was kept stirred, and when the surface flow velocity of the suspension at a portion where a 1.6 mol/l aqueous cobalt sulfate solution was to be added as an aqueous cobalt salt solution reached a steady state of 15.8 cm/sec, 2.017 liters of the aqueous cobalt sulfate solution was added in 2 hours at a supply rate of 16.8 ml/sec, using a roller pump from one supply port having a diameter of 2 mm. At the same time, a 24 mass aqueous sodium hydroxide solution was added from one supply port to a portion where the surface flow rate of the suspension was the same as described above under control using a roller pump interfacing with a pH controller so that the pH of the suspension was 10.2±0.2 as measured at 25° C. The supply port for the aqueous sodium hydroxide solution was provided 15 cm away from the supply port for the aqueous cobalt sulfate solution in a horizontal direction, and had the same diameter as the supply port for the aqueous cobalt sulfate solution.

At this time, the ratio of the supply rate $\rho$ (mol/sec) of the aqueous cobalt salt solution to the product of the supply width d (cm) of the aqueous cobalt salt solution in a direction orthogonal to the flow direction of the suspension and the flow velocity v (cm/sec) of the suspension in a contact portion between the surface of the suspension and the aqueous cobalt salt solution supplied thereto, that is, $\rho/(d \times v)$ was $1.42 \times 10^{-4}$ mol/cm$^2$. Further, the ratio of the distance D (cm) between the supply position of the aqueous cobalt salt solution and the supply position of the aqueous alkali solution to the ratio of the supply rate $\rho$ of the aqueous cobalt salt solution to the product of the supply width d of the aqueous cobalt salt solution and the flow velocity v of the suspension, that is, $D/\{\rho/(d \times v)\}$ was $1.06 \times 10^5$ cm$^3$/mol. It is to be noted that the temperature of the suspension during reaction was controlled to be 50° C.

As a result of the coating step described above, the total amount of cobalt sulfate supplied to the suspension was deposited as cobalt hydroxide on the surface of particles of the nickel hydroxide powder so that a cobalt-hydroxide-coated nickel hydroxide powder whose particles had a cobalt hydroxide coating on the surface thereof was obtained.

After the completion of the coating step, sodium hydroxide was further added to the stirred suspension to increase the pH of the suspension to 12.8. In this way, a slurry to be used in the oxidation step was obtained. Then, air was blown into the slurry at a flow rate of 3.5 l/min for 4 hours to oxidize cobalt hydroxide deposited on the surface of the nickel hydroxide particles in the coating step to cobalt oxyhydroxide. At this time, the total amount of oxygen supplied per mole of cobalt in the coating was 52.0 l/mol, and the amount of oxygen supplied per mole of cobalt in the coating and unit time was 0.22 l/min·mol.

Then, the suspension was subjected to solid-liquid separation using a filter press to collect the powder, and the powder was washed with water and again subjected to filtration. Then, the obtained powder was dried in a vacuum drier at 120° C. for 20 hours to obtain 6.3 kg of a coated nickel hydroxide powder. The obtained coated nickel hydroxide powder was dark brown. The powder was observed with a SEM to evaluate the state of its coating. As a result, as shown in FIG. 1, the nickel hydroxide particles were found to have a uniform coating layer.

The coated nickel hydroxide powder had, on the surface of particles thereof, a coating mainly containing cobalt oxyhydroxide or a mixture of cobalt oxyhydroxide and cobalt hydroxide, and the valence of cobalt in the coating was 2.8. It is to be noted that the valence of cobalt in the coating was determined in the following manner. First, trivalent cobalt was analyzed, and the amount of bivalent cobalt was determined from the total amount of cobalt, and then the average valence of cobalt was calculated. The analysis of trivalent cobalt was performed according to a method described in, for example, "Fractional determination of metal cobalt, cobalt(II), and cobalt(III) in cobalt oxide" (by Namiki Michiko and Hirokawa Kichinosuke, "BUNSEKI KAGAKU", pp. 30 to 143, 1981), that is, by a method in which a ferric chloride solution, was used, and titration with a potassium dichromate solution was performed using sodium diphenylamine sulfonate as an indicator.

Then, 20 g of the coated nickel hydroxide powder was placed in a polyethylene jar (capacity; 50 ml, manufactured by SUNPLASTICS Co., Ltd.) having a capacity of 50 ml. The polyethylene jar was tightly closed and shaken for 1 hour using a TURBULA shaker mixer (TURBULA Type T2C manufactured by Willy A. Bachofen (WAB)). After the completion of the one-hour shaking, the presence or absence of peeling-off of the cobalt oxyhydroxide coating was determined. As a result, adhesion of small pieces of the coating peeled off or the like to the inside of the jar was not observed, that is, peeling-off of the coating was not observed.

After the completion of the shaking, 10 g of the cobalt-oxyhydroxide-coated nickel hydroxide powder was mixed with 200 ml of pure water with stirring, and the mixture was allowed to stand to settle the cobalt-oxyhydroxide-coated nickel hydroxide powder to separate the cobalt oxyhydroxide coating peeled off as a supernatant. The amount of the coating peeled off was determined by comparison of cobalt content between the cobalt-oxyhydroxide-coated nickel hydroxide powder after separation and the cobalt-oxyhydroxide-coated nickel hydroxide powder before shaking, and was found to be 14 mass % of the total mass of the coating.

It is to be noted that also when a substance other than the cobalt compound such as cobalt oxyhydroxide or cobalt hydroxide is contained in the coating, cobalt can be considered to be uniformly dispersed in the coating; therefore, the amount of the coating peeled off can be measured by the above measurement method.

Example 2

A reactor having a diameter of 84 cm and a depth of 100 cm was prepared, 240 kg of the same spherical nickel hydroxide powder as used in Example 1 having an average particle size of 8 μm was placed in the reactor, and water was added to the reactor so that a total volume was 350 liters. Then, the nickel hydroxide powder was dispersed in the water by stirring using a propeller stirrer at a rotation speed of 350 rpm to prepare a suspension of the nickel hydroxide powder.

Then, 80.7 liters of an aqueous cobalt sulfate solution adjusted to a concentration of 1.6 mol/l was added in 2 hours using a roller pump from 10 supply ports each having a diameter of 2 mm at an addition rate of 67.2 ml/min per supply port to positions where the surface flow velocity of the suspension was 49.7 cm/sec. At the same time a 24 mass % aqueous sodium hydroxide solution was added to its supply position under control using a roller pump interfacing with a pH controller so that the pH of the suspension was in the range of 10.2±0.2 as measured at 25° C. The supply position of the aqueous sodium hydroxide solution was 20 cm away from the nearest one of contact portions between the aqueous cobalt sulfate solution supplied from the 10 supply ports and the surface of the suspension, and the surface flow velocity of the suspension in the supply position of the aqueous sodium hydroxide solution was the same as described above. In this way, cobalt hydroxide was deposited on the surface of nickel hydroxide particles.

At this time, the ratio of the supply rate $\rho$ (mol/sec) of the aqueous cobalt salt solution to the product of the supply width d (cm) of the aqueous cobalt salt solution in a direction orthogonal to the flow direction of the suspension and the flow velocity v (cm/sec) of the suspension in each of the contact portions between the surface of the suspension and the aqueous cobalt salt solution supplied thereto, that is, $\rho/(d \times v)$ was $1.80 \times 10^{-4}$ mol/cm². Further, with regard to the supply port for the aqueous cobalt salt solution nearest the supply position of sodium hydroxide, the ratio of the distance D (cm) between the supply position of the aqueous cobalt salt solution and the supply position of the aqueous alkali solution to the ratio of the supply rate $\rho$ of the aqueous cobalt salt solution to the product of the supply width d of the aqueous cobalt salt solution and the flow velocity v of the suspension, that is, $D/\{\rho/(d \times v)\}$ was $1.11 \times 10^5$ cm³/mol. It is to be noted that the temperature of the suspension during reaction was controlled to be 50° C.

As a result of the coating step described above, the total amount of cobalt sulfate supplied to the suspension was deposited as cobalt hydroxide on the surface of particles of the nickel hydroxide powder so that a cobalt-hydroxide-coated nickel hydroxide powder whose particles had a cobalt hydroxide coating on the surface thereof was obtained.

After the completion of the coating step, sodium hydroxide was further added to the stirred suspension to increase the pH of the suspension to 12.8. In this way, a slurry to be used in the oxidation step was obtained. Then, air was blown into the slurry at a flow rate of 140 l/min for 4 hours to oxidize cobalt hydroxide deposited on the surface of the nickel hydroxide particles in the coating step to cobalt oxyhydroxide. At this time, the total amount of oxygen supplied per mole of cobalt in the coating was 52.0 l/mol, and the amount of oxygen supplied per mole of cobalt in the coating and unit time was 0.22 l/min·mol.

Then, the suspension was subjected to solid-liquid separation using a filter press to collect, the powder, and the powder was washed with water and again subjected to filtration. Then, the obtained powder was dried in a vacuum drier at 120° C. for 20 hours to obtain 252 kg of a coated nickel hydroxide powder. The obtained coated nickel hydroxide powder was dark brown. The powder was observed with a SEM to evaluate the state of its coating. As a result, the nickel hydroxide particles were found to have a uniform coating as in the case of Example 1.

The coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.8. Further, the coated nickel hydroxide powder was shaken in the same manner as in Example 1, and as a result, adhesion of small pieces of the coating peeled off or the like to the inside of the jar was not observed, and the amount of the coating peeled off was 15 mass % of the total mass of the coating.

Example 3

A reactor having a diameter of 190 cm and a depth of 220 cm was prepared, 2890 kg of the same spherical nickel hydroxide powder having an average particle size of 8 μm as used in Example 1 was placed in the reactor, and water was added to the reactor so that a total volume was 3000 liters. Then, the nickel hydroxide powder was dispersed in the water by stirring using a propeller stirrer at a rotation speed of 150 rpm to prepare a suspension of the nickel hydroxide powder.

Then, 968.3 liters of an aqueous cobalt sulfate solution adjusted to a concentration of 1.6 mol/l was added in 2 hours using a roller pump from 2 nozzles at an addition rate of 4035 ml/min per nozzle by spraying the aqueous cobalt sulfate solution in a circular pattern having a diameter of 500 mm onto the surface of the suspension where the surface flow velocity of the suspension was 126.5 cm/sec. At the same time, a 24 mass % aqueous sodium hydroxide solution was added to its supply position under control using a roller pump interfacing with a pH controller so that the pH of the suspension was in the range of 10.2±0.2 as measured at 25° C. The supply position of the aqueous sodium hydroxide solution was 20 cm away from the nearest one of contact portions between the aqueous cobalt sulfate solution supplied from the two nozzles and the surface of the suspension, and the surface flow velocity of the suspension in the supply position of the aqueous sodium hydroxide solution was the same as described above. In this way, cobalt hydroxide was deposited on the surface of nickel hydroxide particles.

At this time, the ratio of the supply rate $\rho$ (mol/sec) of the aqueous cobalt salt solution to the product of the supply width d (cm) of the aqueous cobalt salt solution in a direction orthogonal to the flow direction of the suspension and the flow velocity v (cm/sec) of the suspension in each of the contact portions between the surface of the suspension and the aqueous cobalt salt solution supplied thereto, that is, $\rho/(d \times v)$ was $1.70 \times 10^{-5}$ mol/cm². With regard to the nozzle for the aqueous cobalt salt solution nearest the supply position of sodium hydroxide, the ratio of the distance D (cm) between the supply position of the aqueous cobalt salt solution and the supply position of the aqueous alkali solution to the ratio of the supply rate $\rho$ of the aqueous cobalt salt solution, to the product of the supply width d of the aqueous cobalt salt solution and the flow velocity v of the suspension, that is, $D/\{\rho/(d \times v)\}$ was $11.8 \times 10^5$ cm³/mol. It is to be noted that the temperature of the suspension during reaction was controlled to be 50° C.

As a result of the coating step described above, the total amount of cobalt sulfate supplied to the suspension was deposited as cobalt hydroxide on the surface of particles of the nickel hydroxide powder so that a cobalt-hydroxide-coated nickel hydroxide powder whose particles had a cobalt hydroxide coating on the surface thereof was obtained.

After the completion of the coating step, sodium hydroxide was further added to the stirred suspension to increase the pH of the suspension to 12.8. In this way, a slurry to be used in the oxidation step was obtained. Then, air was blown into the slurry at a flow rate of 1680 l/min for 4 hours to oxidize cobalt hydroxide deposited on the surface of the nickel hydroxide particles in the coating step to cobalt oxyhydroxide. At this time, the total amount of oxygen supplied per mole of cobalt in the coating was 52.0 l/mol, and the amount of oxygen supplied per mole of cobalt in the coating and unit time was 0.22 l/min·mol.

Then, the suspension was subjected to solid-liquid separation using a filter press to collect the powder, and the powder was washed with water and again subjected to filtration; Then, the obtained powder was dried in a vacuum drier at 120° C. for 20 hours to obtain 3165 kg of a coated nickel hydroxide powder. The obtained coated nickel hydroxide powder was dark brown. The powder was observed with a SEM to evaluate the state of its coating. As a result, the nickel hydroxide particles were found to have a uniform coating as in the case of Example 1.

The coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.9. Further, the coated nickel hydroxide powder was shaken in the same manner as in Example 1, and as a result, adhesion of small pieces of the coating peeled off or the like to the inside of the jar was not observed, and the amount of the coating peeled off was 12 mass % of the total mass of the coating.

Example 4

A cobalt-hydroxide-coated nickel hydroxide powder was obtained in the same manner as in Example 1 except that in the oxidation step, air was blown into the slurry whose pH had been increased to 12.8 at a flow rate of 8.0 l/min for 2 hours to oxidize cobalt hydroxide deposited on the surface of the nickel hydroxide particles in the coating step to cobalt oxyhydroxide. At this time, the total amount of oxygen supplied per mole of cobalt in the coating was 59.5 l/mol, and the amount of oxygen supplied per mole of cobalt in the coating and unit time was 0.50 l/min·mol.

The obtained coated nickel hydroxide powder was dark brown. The powder was observed with a SEM to evaluate the state of its coating. As a result, the nickel hydroxide particles were found to have a uniform coating as in the case of Example 1.

The coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.6. Further, the coated nickel hydroxide powder was shaken in the same manner as in Example 1, and as a result, small dark brown adherents very slightly adhered to the inside of the jar, and the amount of the coating peeled off was 20 mass % of the total mass of the coating.

Comparative Example 1

A cobalt hydroxide-coated nickel hydroxide powder was obtained in the same manner as in Example 1 except that the rotation speed of the propeller stirrer was changed to 300 rpm and that an aqueous cobalt sulfate solution and an aqueous sodium hydroxide solution were added when the surface flow velocity of the suspension in a portion where the aqueous cobalt sulfate solution was to be added reached a steady state of 5 cm/sec.

At this time, the ratio of the supply rate $\rho$ of the aqueous cobalt salt solution to the product of the supply width d of the aqueous cobalt salt solution supplied to the suspension and the flow velocity v of the suspension, that is, $\rho/(d \times v)$ was $4.48 \times 10^{-4}$ mol/cm². Further, the ratio of the distance D between the supply position of the aqueous cobalt salt solution and the supply position of the aqueous alkali solution to the ratio of the supply rate $\rho$ of the aqueous cobalt salt solution to the product of the supply width d of the aqueous cobalt salt solution and the flow velocity v of the suspension, that is, $D/\{\rho/(d \times v)\}$ was $0.335 \times 10^5$ cm³/mol. It is to be noted that the temperature of the suspension during reaction was controlled to be 50° C.

After the completion of the coating step, the pH of the suspension was not increased but was kept at 10.2±0.2, and the obtained suspension was used as a slurry in the oxidation step. Air was blown into the slurry for 4 hours in the same manner as in Example 1 to oxidize cobalt hydroxide deposited on the surface of the nickel hydroxide particles in the coating step to cobalt oxyhydroxide.

Figure 2:
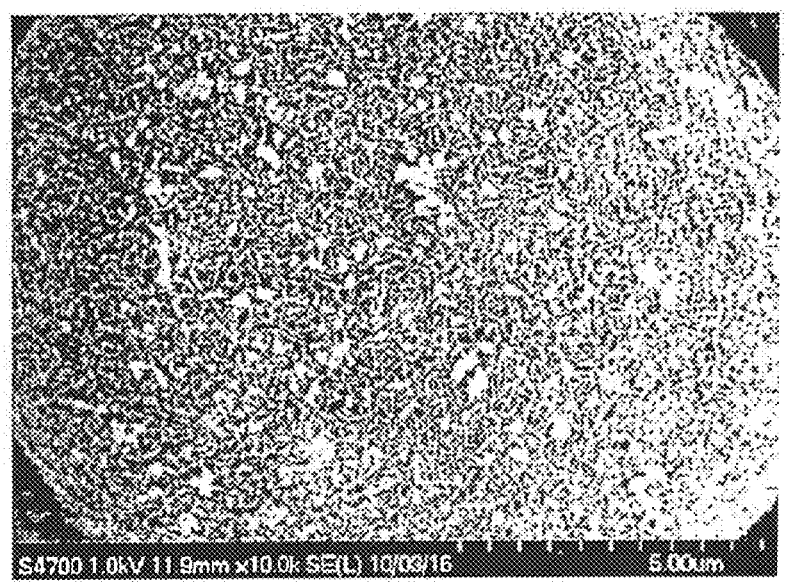
FIG. 2 A scanning electron micrograph of a cobalt-oxyhydroxide-coated nickel hydroxide powder prepared in Comparative Example 1.

The obtained powder was washed, filtered, and dried in the same manner as in Example 1 to obtain a coated nickel hydroxide powder. The obtained coated nickel hydroxide powder was dark brown. The powder was observed with a SEM to evaluate the state of its coating. As a result, as shown in FIG. 2, cobalt oxyhydroxide scales were observed in some positions on the surface of the nickel hydroxide particles; therefore, the nickel hydroxide particles were found to be non-uniformly coated.

The coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.3. Further, the coated nickel hydroxide powder was shaken in the same manner as in Example 1, and as a result, adhesion of small dark brown particles to the inside of the jar was observed. The adhered particles were analyzed by EDX, and as a result, cobalt was detected, from which it was confirmed that peeling-off of the coating occurred. Further, the amount of the coating peeled off was 29 mass % of the total mass of the coating.

Comparative Example 2

A cobalt-oxyhydroxide-coated nickel hydroxide powder was obtained in the same manner as in Example 2 except that the aqueous cobalt sulfate solution was added using a roller pump in 2 hours at an addition rate of 672.4 ml/min from one supply port having a diameter of 8 mm.

At this time, the ratio of the supply rate $\rho$ of the aqueous cobalt salt solution to the product of the supply width d of the aqueous cobalt salt solution supplied to the suspension and the flow velocity v of the suspension, that is, $\rho/(d \times v)$ was $4.51 \times 10^{-4}$ mol/cm$^2$. Further, the ratio of the distance D between the supply position of the aqueous cobalt salt solution and the supply position of the aqueous alkali solution to the ratio of the supply rate $\rho$ of the aqueous cobalt salt solution to the product of the supply width d of the aqueous cobalt salt solution and the flow velocity v of the suspension, that is, $D/\{\rho/(d \times v)\}$ was $0.443 \times 10^5$ cm$^3$/mol. It is to be noted that the temperature of the suspension during reaction was controlled to be 50° C.

The obtained coated nickel hydroxide powder was dark brown. The powder was observed with a SEM to evaluate the state of its coating. As a result, cobalt oxyhydroxide scales were observed in some positions on the surface of the nickel hydroxide particles as in the case of Comparative Example 1; therefore, the nickel hydroxide particles were found to be non-uniformly coated.

The cobalt-oxyhydroxide-coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.7. Further, the coated nickel hydroxide powder was shaken in the same manner as in Example 1, and as a result, adhesion of small dark brown particles to the inside of the jar was observed. The adhered particles were analyzed by EDX, and as a result, cobalt was detected, from which it was confirmed that peeling-off of the coating occurred. Further, the amount of the coating peeled off was 26 mass % of the total mass of the coating.

Comparative Example 3

A coated nickel hydroxide powder was obtained in the same manner as in Example 1 except that after the completion of the coating step for coating the surface of nickel hydroxide with cobalt hydroxide, the pH of the suspension was increased to 12.0 by adding sodium hydroxide to the stirred suspension to obtain a slurry to be used in the oxidation step for oxidizing cobalt hydroxide to cobalt oxyhydroxide and that air was blown into the slurry at a flow rate of 3.5 l/min for 4 hours to oxidize cobalt hydroxide on the surface of the nickel hydroxide particles to cobalt oxyhydroxide. At this time, the total amount of oxygen supplied per mole of cobalt in the coating was 52.0 l/mol, and the amount of oxygen supplied per mole of cobalt in the coating and unit time was 0.22 l/min·mol.

The obtained coated nickel hydroxide powder was slightly greenish dark brown. The powder was observed with a SEM to evaluate the state of its coating. As a result, the nickel hydroxide particles were found to have a uniform coating as in the case of Example 1.

The coated nickel hydroxide powder had, on the surface of particles thereof, a coating mainly containing cobalt oxyhydroxide or a mixture of cobalt oxyhydroxide and cobalt hydroxide. The valence of cobalt in the coating was determined in the same manner as in Example 1 and was found to be 2.4. Further, the coated nickel hydroxide powder was shaken in the same manner as in Example 1, and as a result, adhesion of small dark brown particles to the inside of the jar was observed. The adhered particles were analyzed by EDX, and as a result, cobalt was detected, from which it was confirmed that peeling-off of the coating occurred. Further, the amount of the coating peeled off was 22 mass % of the total mass of the coating.

As can be seen from the above Examples and Comparative Examples, the coated nickel hydroxide powder of each of Examples has a uniform coating on the surface of particles thereof, and the coating has high adhesion properties and has been properly oxidized to cobalt oxyhydroxide. However, in Example 4 in which the total amount of oxygen supplied was similar to those of Examples 1 to 3 but the amount of oxygen supplied per unit time was larger than those of Examples 1 to 3, there was a tendency that the valence of cobalt was slightly lower, and the adhesion properties of the coating was slightly reduced.

On the other hand, in Comparative Examples 1 and 2 in which the ratio of the supply rate ($\rho$) of the aqueous cobalt salt solution to the product of the supply width (d) of the aqueous cobalt salt solution and the flow velocity (v) of the suspension in the coating step, that is, $\rho/(d \times v)$ was larger than $3.5 \times 10^{-4}$ mol/cm$^2$, the amount of the coating peeled off was larger than those of Examples, and the adhesion properties of the coating was inferior to that of Examples. Further, in Comparative Example 3 in which the pH of the slurry in the oxidation step was lower, the valence of cobalt was lower than those of Examples, and the adhesion properties of the coating was significantly reduced.

Further, the pressed powder resistance of each of the coated nickel hydroxide powders of Examples and Comparative Examples was measured. As a result, the coated nickel hydroxide powders of Examples were found to have higher conductivity than the coated nickel hydroxide powders of Comparative Examples. This shows that the coated nickel hydroxide powders of Examples are suitable for a positive electrode active material of alkaline secondary battery.

INDUSTRIAL APPLICABILITY

The coated nickel hydroxide powder according to the present invention has high conductivity; therefore, its utilization ratio for a positive electrode active material of alkaline secondary battery is high. Therefore, the coated nickel hydroxide powder according to the present invention is suitable for use in a power source for portable electronic device required to have a high capacity. Further, the coated nickel hydroxide powder according to the present invention is suitable for use in a power source for electric car or hybrid car required to have high-output characteristics.

The invention claimed is:

1. A production method for a coated nickel hydroxide powder for a positive electrode active material of alkaline secondary battery, the method comprising:
a coating step in which an aqueous cobalt salt solution and an aqueous alkali solution are supplied to a stirred suspension obtained by dispersing a nickel hydroxide powder in water to form, on a surface of nickel hydroxide particles, a coating mainly containing cobalt hydroxide crystallized out by neutralization; and
an oxidation step in which oxygen is supplied to a stirred slurry of the nickel hydroxide particles having the coating formed thereon to oxidize cobalt hydroxide in the coating, wherein
in the coating step, a ratio of a supply rate $\rho$ (mol/sec) of the aqueous cobalt salt solution to a product of a supply width d (cm) of the aqueous cobalt salt solution in a direction orthogonal to a flow direction of the suspension and a flow velocity v (cm/sec) of the suspension in a contact portion between a surface of the suspension and the aqueous cobalt salt solution supplied thereto, that is, $\rho/(d \times v)$ is controlled to be $3.5 \times 10^{-4}$ mol/cm$^2$ or less while a pH of the suspension mixed with the aqueous cobalt salt solution and the aqueous alkali solution as measured at 25° C. is kept at 8 to 11.5, and
in the oxidation step, a pH of the slurry is adjusted such that a pH value of the slurry is 12.5 to 13.0 and a fluctuation range of the pH value is +−0.2 as measured at 25° C., and a total amount of oxygen supplied by blowing into the slurry per mole of cobalt in the coating is 30 l/mol or more.

2. The production method for a coated nickel hydroxide powder for a positive electrode active material of alkaline secondary battery according to claim 1, wherein in the oxidation step, a temperature of the slurry is set to 40 to 60° C.

3. The production method for a coated nickel hydroxide powder for a positive electrode active material of alkaline secondary battery according to claim 2, wherein in the oxidation step, an amount of oxygen supplied per mole of cobalt in the coating and unit time is set to 0.2 to 0.45 l/min·mol, and a supply time of oxygen is set to 2.5 to 4.0 hours.

4. The production method for a coated nickel hydroxide powder for a positive electrode active material of alkaline secondary battery according to claim 2, wherein in the coating step, a ratio of a distance D (cm) of separation between a supply position of the aqueous cobalt salt solution and a supply position of the aqueous alkali solution to the ratio of the supply rate p of the aqueous cobalt salt solution to the product of the supply width d of the aqueous cobalt salt solution and the flow velocity v of the suspension, that is, $D/\{\rho/(d \times v)\}$ is controlled to be $0.5 \times 10^5$ cm$^3$/mol or more.

5. The production method for a coated nickel hydroxide powder for a positive electrode active material of alkaline secondary battery according to claim 1, wherein in the oxidation step, an amount of oxygen supplied per mole of cobalt in the coating and unit time is set to 0.2 to 0.45 l/min·mol, and a supply time of oxygen is set to 2.5 to 4.0 hours.

6. The production method for a coated nickel hydroxide powder for a positive electrode active material of alkaline secondary battery according to claim 1, wherein in the coating step, a ratio of a distance D (cm) of separation between a supply position of the aqueous cobalt salt solution and a supply position of the aqueous alkali solution to the ratio of the supply rate p of the aqueous cobalt salt solution to the product of the supply width d of the aqueous cobalt salt solution and the flow velocity v of the suspension, that is, $D/\{\rho/(d \times v)\}$ is controlled to be $0.5 \times 10^5$ cm$^3$/mol or more.

7. The production method for a coated nickel hydroxide powder for a positive electrode active material of alkaline secondary battery according to claim 1, wherein a lower limit of the ratio $\rho/(d \times v)$ is $0.01 \times 10^{-4}$ mol/cm$^2$.

8. The production method for a coated nickel hydroxide powder for a positive electrode active material of alkaline secondary battery according to claim 1, wherein the total amount of oxygen supplied by blowing into the slurry per mole of cobalt in the coating is 110 l/mol or less.

* * * * *